(12) United States Patent
Shim et al.

(10) Patent No.: US 12,363,815 B2
(45) Date of Patent: Jul. 15, 2025

(54) FILM FOR MANUFACTURING ELECTRONIC COMPONENT

(71) Applicant: SAMSUNG ELECTRO-MECHANICS CO., LTD., Suwon-si (KR)

(72) Inventors: Dae Jin Shim, Suwon-si (KR); Jung Jin Park, Suwon-si (KR); Su Min Kim, Suwon-si (KR); Jong Ho Lee, Suwon-si (KR); Eun Jung Lee, Suwon-si (KR); Jung Jin Park, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 252 days.

(21) Appl. No.: 17/831,025

(22) Filed: Jun. 2, 2022

(65) Prior Publication Data
US 2023/0156896 A1    May 18, 2023

(30) Foreign Application Priority Data
Nov. 15, 2021   (KR) .................... 10-2021-0157011

(51) Int. Cl.
H05F 1/00      (2006.01)
H01G 4/30      (2006.01)
H01G 13/00     (2013.01)

(52) U.S. Cl.
CPC .............. *H05F 1/00* (2013.01); *H01G 13/00* (2013.01); *H01G 4/30* (2013.01)

(58) Field of Classification Search
CPC ............ H05F 1/00; H01G 13/00; H01G 4/30
See application file for complete search history.

(56) References Cited

U.S. PATENT DOCUMENTS

| 2010/0244585 A1 * | 9/2010 | Tan ....................... H01G 4/30 |
| | | 29/25.42 |
| 2013/0056244 A1 * | 3/2013 | Srinivas ............... H05K 1/0298 |
| | | 174/250 |
| 2014/0178247 A1 * | 6/2014 | Alsayed ................ B22F 9/18 |
| | | 75/343 |
| 2019/0267192 A1 * | 8/2019 | Sato .................... C04B 35/6342 |

FOREIGN PATENT DOCUMENTS

| CA | 2820864 A1 * | 6/2012 | ............. B22F 1/0025 |
| CN | 106832772 A  * | 6/2017 | |
| CN | 109461577 A  * | 3/2019 | ............. H01B 17/60 |

(Continued)

OTHER PUBLICATIONS

Machine translation JP2007119605A (Year: 2007).*

(Continued)

*Primary Examiner* — Jacob T Minskey
*Assistant Examiner* — Wayne K. Swier
(74) *Attorney, Agent, or Firm* — MORGAN, LEWIS & BOCKIUS LLP

(57) ABSTRACT

A film for manufacturing an electronic component includes: a polymer layer; and metal nanowires dispersed in the polymer layer. The polymer layer may include a polyester-based compound such as polyethylene terephthalate. The metal nanowire may include a ferromagnetic metal such as at least one of nickel (Ni), cobalt (Co), and iron (Fe), or alloys thereof.

17 Claims, 5 Drawing Sheets

(56) References Cited

FOREIGN PATENT DOCUMENTS

| | | | | |
|---|---|---|---|---|
| CN | 112961635 A | * | 6/2021 | .............. C09J 11/04 |
| JP | 2007119605 A | * | 5/2007 | |
| JP | 2019-081869 A | | 5/2019 | |
| KR | 1019980020314 A | * | 6/1998 | |
| KR | 10-2039301 B1 | | 10/2019 | |
| WO | WO-2019208580 A1 | * | 10/2019 | |

OTHER PUBLICATIONS

Machine translation KR19980020314 (Year: 1998).*
Machine translation CN106832772A (Year: 2017).*
Machine translation WO2019208580A1 (Year: 2019).*
Machine translation CN109461577A (Year: 2019).*
Machine translation CN112961635A (Year: 2021).*

* cited by examiner

FILM FOR MANUFACTURING ELECTRONIC COMPONENT

CROSS-REFERENCE TO RELATED APPLICATION(S)

This application claims benefit of priority to Korean Patent Application No. 10-2021-0157011 filed on Nov. 15, 2021 in the Korean Intellectual Property Office, the disclosure of which is incorporated herein by reference in its entirety.

TECHNICAL FIELD

The present disclosure relates to a film for manufacturing an electronic component, and more particularly, to a film for manufacturing an electronic component used at the time of manufacturing a multilayer electronic component.

BACKGROUND

When a deviation in a fabric thickness of a polyester film used at the time of manufacturing a high-end thin/highly stacked multilayer ceramic capacitor (MLCC) increases, withstand voltage characteristics are decreased and a short-circuit rate is increased, due to an increase in a thickness dispersion of dielectric layers of the MLCC. In addition, as the dielectric layer becomes thinner, mixing of foreign materials due to static electricity in a molding and stacking process (roll to roll) has a significant influence on characteristics of an MLCC product.

In the related art, in order to closely adhere and cool an extruded high-temperature film for manufacturing an electronic component on a casting roll, a static electricity applying agent is added to the film in a polymer polymerization step or the film is physically closely adhered and cooled through an air nozzle. In this case, in order to impart an antistatic property to the film, a low molecular weight antistatic agent is injected into the film and moved to a surface or a solution is coated and dried on a surface of a finished film.

However, when an excessive amount of static electricity applying agent is added, compatibility of the static electricity applying agent in a melted polymer is decreased, which may cause a decrease in a surface roughness of a film. In addition, in a case of the air nozzle, an optimal cooling condition is determined according to a distance between the air nozzle, a casting roll for cooling, and an extruded film, and a maximum cooling effect is not necessarily achieved at a maximum air volume. When an air volume is increased to significantly increase a degree of close adhesion and cooling efficiency of the extruded film, an air mark may be generated on a surface of the extruded film.

Therefore, a film for manufacturing an electronic component for decreasing damage occurring in a film manufacturing process and an electronic component manufacturing process while securing both conductivity and a magnetic property using metal nanowires has been devised.

SUMMARY

An aspect of the present disclosure may provide a film for manufacturing an electronic component for preventing generation of static electricity during a manufacturing process.

An aspect of the present disclosure may also provide a film for manufacturing an electronic component for increasing cooling efficiency during a manufacturing process.

An aspect of the present disclosure may also provide a film for manufacturing an electronic component having a uniform thickness.

An aspect of the present disclosure may also provide a film for manufacturing an electronic component for facilitating peeling of a ceramic sheet and enabling manufacturing of the electronic component without damage, at the time of manufacturing the electronic component.

According to an aspect of the present disclosure, a film for manufacturing an electronic component may include: a polymer layer, and metal nanowires dispersed in the polymer layer.

According to an aspect of the present disclosure, a method for manufacturing an electronic component may include contacting a film and the electronic component, and then peeling the film from the electronic component, where the film may include a polymer layer, and metal nanowires dispersed in the polymer layer, the metal nanowires may include a ferromagnetic metal including at least one of nickel (Ni), cobalt (Co), and iron (Fe), or alloys thereof.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Figure 1:
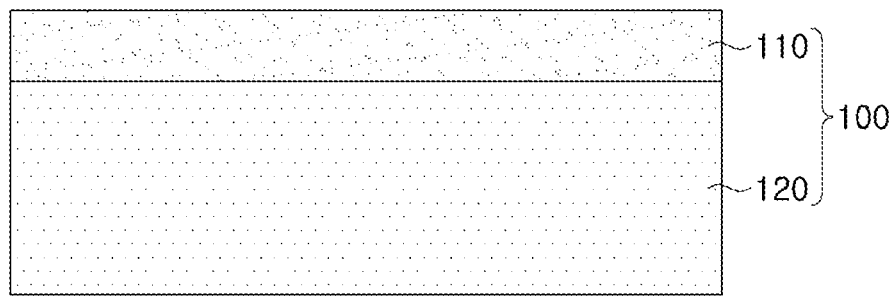
FIG. 1 is a schematic cross-sectional view illustrating a film for manufacturing an electronic component according to an exemplary embodiment in the present disclosure.

Hereinafter, exemplary embodiments of the present disclosure will now be described in detail with reference to the accompanying drawings.

In the drawings, a first direction may refer to a stacked direction or a thickness T direction, a second direction may refer to a length L direction, and a third direction may refer to a width W direction.

Films 10 and 11 for manufacturing an electronic component according to an exemplary embodiment and a modified example in the present disclosure may be used to manufacture electronic components such as capacitors including multilayer ceramic capacitors (MLCCs), inductors, and resistors. As an example, the films 10 and 11 for manufacturing an electronic component may function as a base material for supporting a molded layer and a printed layer of a multilayer capacitor under the lowermost layer in a process of stacking the multilayer capacitor to easily fix the electronic component in the process of stacking the multilayer capacitor, and may serve to decrease generation of static electricity to block mixing of foreign materials. The films 10 and 11 for manufacturing an electronic component may be peeled off from the electronic component after the process of stacking the multilayer capacitor.

Hereinafter, a configuration of the film for manufacturing an electronic component according to the present disclosure will be described in detail with reference to the drawings.

FIG. 1 is a schematic cross-sectional view illustrating a film for manufacturing an electronic component according to an exemplary embodiment in the present disclosure.

The film 10 for manufacturing an electronic component according to an exemplary embodiment may include a polymer layer 100 and metal nanowires 112 dispersed in the polymer layer 100. Referring to FIG. 1, the polymer layer 100 may include a front surface layer 110 and a rear surface layer 120 disposed on one surface of the front surface layer 110.

Figure 2:
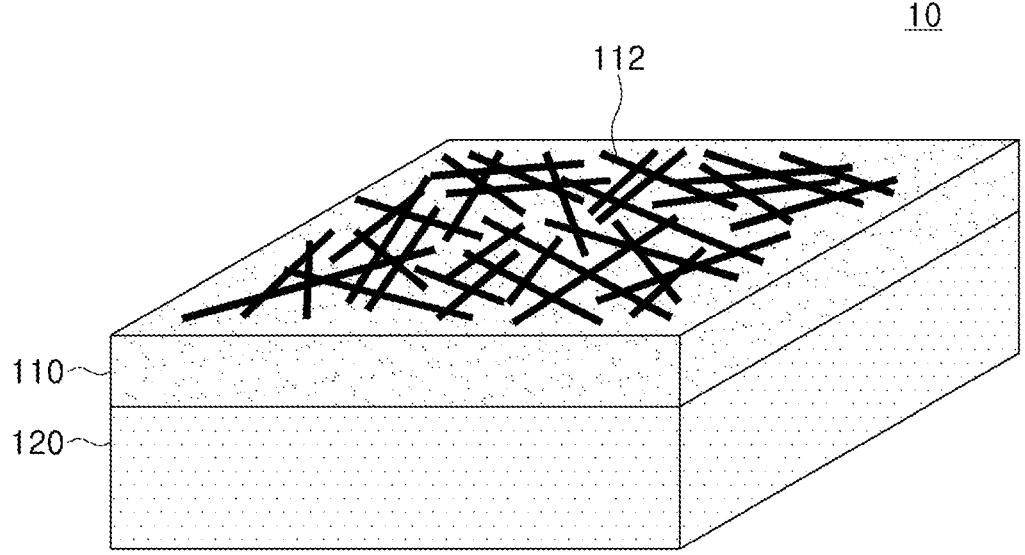
FIG. 2 is a schematic perspective view illustrating the film for manufacturing an electronic component of FIG. 1.

FIG. 2 is a schematic perspective view illustrating the film for manufacturing an electronic component of FIG. 1.

Figure 3:
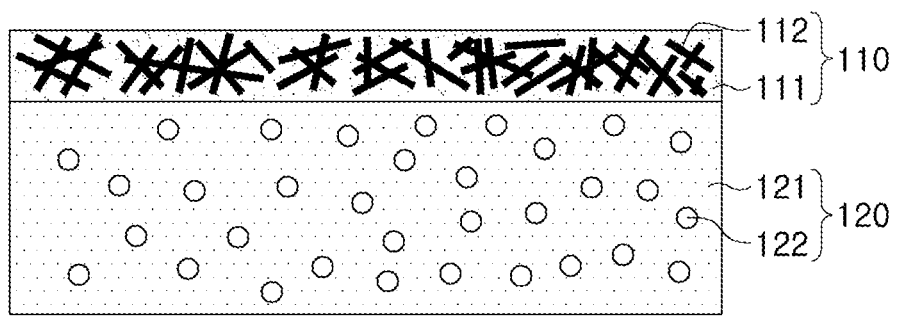
FIG. 3 is a schematic cross-sectional view illustrating an internal configuration of the film for manufacturing an electronic component according to an exemplary embodiment in the present disclosure.

FIG. 3 is a schematic cross-sectional view illustrating an internal configuration of the film for manufacturing an electronic component according to an exemplary embodiment in the present disclosure.

Referring to FIG. 2, the metal nanowires 112 may be dispersed in the front surface layer 110 of the film 10 for manufacturing an electronic component according to an exemplary embodiment.

Specifically, referring to FIG. 3, the front surface layer 110 may include a first resin layer 111 and the metal nanowires 112 dispersed in the first resin layer 111.

The first resin layer 111 may include a polyester-based compound or a polyester-based polymer, and a main repeating unit of the first resin layer 111 may be, for example, at least one of ethylene terephthalate and ethylene naphthalate. As an example, the first resin layer 111 may include polyethylene terephthalate (PET) formed by condensation polymerization of ethylene glycol with terephthalic acid. In this case, the polyethylene terephthalate may be prepared using a direct method that uses the terephthalic acid described above, but may also be prepared by a DMT method that uses dimethyl terephthalate.

The metal nanowires 112 may be wire-shaped structures having a size of a nanometer. Here, an average particle size of the metal nanowires 112 may be 10 nm to 1.0 μm, and an aspect ratio of the metal nanowires 112 may be 10 to 500. Specifically, in the film 10 for manufacturing an electronic component according to an exemplary embodiment in the present disclosure, the metal nanowire 112 may include a metal material, which may be a monoatomic ferromagnetic metal. The metal nanowire may be synthesized by a vapor liquid solid (VLS) process, but is not limited thereto.

Examples of the monoatomic ferromagnetic metal may include nickel (Ni), cobalt (Co), iron (Fe), or alloys of two or more thereof, but are not limited thereto. Since the film 10 for manufacturing an electronic component according to an exemplary embodiment includes the metal nanowires 112 having both a magnetic property and conductivity, cooling efficiency of an extruded melted film may be improved by closely adhering the extruded melted film to a casting roll or a cooling roll in a casting process to be described later, and the film 10 for manufacturing an electronic component may have an antistatic property to prevent damage to a ceramic layer due to static electricity. Therefore, the film 10 for manufacturing an electronic component having a uniform thickness may be manufactured, a wrinkle defect that may occur in a stacking process due to the static electricity may be improved, and mixing of foreign materials due to the static electricity may be prevented, such that characteristics of the electronic component such as the MLCC may be finally improved.

As illustrated in FIG. 3, the metal nanowires 112 may have a structure in which they are dispersed in the front surface layer 110, but are not limited thereto. As an example, the metal nanowires 112 may be dispersed in a second resin layer 121 of the rear surface layer 120 as well as the front surface layer 110. Meanwhile, when the metal nanowires 112 are dispersed in the front surface layer 110, the front surface layer 110 may be closely adhered to a cooling roll (casting roll) 320 to be described later, and thus, the antistatic property and a close adhesion property of the film 10 may be improved due to the magnetic property and the conductivity of the metal nanowires 112.

In the film 10 for manufacturing an electronic component according to an exemplary embodiment, the metal nanowire 112 may have a needle-like shape. That is, the metal nanowire 112 may have a columnar shape extending in one direction, but is not limited thereto.

When the metal nanowire 112 has the needle-like shape, an aspect ratio of the metal nanowire 112 may be 10 to 500. In addition, sheet resistance of the film 10 for manufacturing an electronic component may be adjusted by mixing a plurality of metal nanowires 112 having a large difference in aspect ratio with each other and dispersing the mixed metal nanowires 112 in the first resin layer 111.

In the film 10 for manufacturing an electronic component according to an exemplary embodiment, the metal nanowires 112 may be included in an amount of less than 0.2 wt % with respect to a content of the front surface layer 110.

TABLE 1

|  | Content (wt %) | Sheet Resistance (Ω/□) | Deviation (max − min) in Thickness of Film | Whether or not Metal Nanowires Are Agglomerated | Amount (kV) of Static Electricity | Amount (kV) of Peeling Static Electricity | Peeling Force (mN) |
| --- | --- | --- | --- | --- | --- | --- | --- |
| Comparative Example 1 | 0 | $10^{14}$ | 1.2 | — | 3~4 | 5~10 | 100% |
| Experimental Example 1 | 0.03 | $10^{12}$ | 1.1 | None | 2~3 | 2~3 | 90% |
| Experimental | 0.05 | $10^{12}$ | 1.0 | None | 0.5-1 | 1~2 | 85% |

TABLE 1-continued

| | Content (wt %) | Sheet Resistance (Ω/□) | Deviation (max − min) in Thickness of Film | Whether or not Metal Nanowires Are Agglomerated | Amount (kV) of Static Electricity | Amount (kV) of Peeling Static Electricity | Peeling Force (mN) |
|---|---|---|---|---|---|---|---|
| Example 2 Experimental Example 3 | 0.1 | $10^9$ | 0.9 | None | 0.0 | 0.0 | 75% |
| Comparative Example 2 | 0.2 | $10^9$ | 0.9 | Aggregated | 0.0 | 0.0 | 75% |
| Comparative Example 3 | 0.3 | $10^9$ | 0.9 | Aggregated | 0.0 | 0.0 | 75% |

Referring to Experimental Examples 1 to 3 of Table 1, a content of the metal nanowires 112 may be less than 0.2 wt % with respect to a content of the front surface layer 110. As in Comparative Examples 2 and 3, when a content of the metal nanowires 112 is 0.2 wt % or more with respect to a content of the front surface layer 110, the content of the metal nanowires 112 may become high, such that a phenomenon in which the metal nanowires 112 are aggregated in the front surface layer 110 may occurs, which may decrease an antistatic property of a film. The agglomeration of the metal nanowires may be observed by electron microscopy imaging such as transmission electron microscopy.

In addition, referring to Experimental Examples 1 to 3 of Table 1, when the metal nanowires 112 are included in the front surface layer 110, a deviation in a thickness of the film 10 for manufacturing an electronic component may be decreased as compared with Comparative Example 1 in which the metal nanowires 112 are not included. Here, the deviation in a thickness may refer to a value obtained by measuring thicknesses of the front surface layer 110 including the metal nanowires 112 in a plurality of arbitrary regions, for example, in 10 different arbitrary regions, and by subtracting a minimum value (Min) of the measured thicknesses from a maximum value (Max) of the measured thicknesses.

That is, as represented in Experimental Examples 1 to 3, the front surface layer 110 may become more uniform by including the metal nanowires 112, and accordingly, an entire thickness of the film 10 for manufacturing an electronic component may also become uniform.

In addition, referring to Experimental Examples 1 to 3 of Table 1, it can be seen that when the metal nanowires 112 are included in the front surface layer 110, generation of static electricity is decreased as compared with Comparative Example 1 in which the metal nanowires 112 are not included. Since the generation of the static electricity is decreased as described above, mixing of foreign materials in a roll to roll process for manufacturing the film 10 for manufacturing an electronic component may be prevented, and when the electronic component such as the MLCC is stacked on the film 10 for manufacturing an electronic component later, a phenomenon in which the foreign materials are mixed into the electronic component may be prevented. Static electricity may be measured by electrostatic sensors, electrostatic voltmeters, electrostatic fieldmeters, coulomb meters, and/or non-contacting electrostatic voltmeters.

In addition, referring to Table 1, when the metal nanowires 112 are included in the front surface layer 110, peeling force (mN) may be decreased as compared with Comparative Example 1 in which the metal nanowires 112 are not included. In the present disclosure, the decrease in the peeling force means that the films 10 and 11 for manufacturing an electronic component may be easily peeled off from the electronic component or the molded layer and the printed layer of the electronic component after a process of stacking the electronic component. The peeling force may be measured by a T-peel test.

Referring to FIG. 3, the film 10 for manufacturing an electronic component according to an exemplary embodiment may further include the rear surface layer 120 disposed on one surface of the front surface layer 110.

The rear surface layer 120 may include the second resin layer 121 and fillers 122 dispersed in the second resin layer 121.

A main repeating unit of the second resin layer 121 may be at least one of ethylene terephthalate and ethylene naphthalate, and the second resin layer 121 may include the same material as the first resin layer 111, but is not limited thereto. As an example, the second resin layer 121 may also include polyethylene terephthalate (PET), but is not limited thereto, and may include other polyester-based compounds or polyester-based polymers. The polyethylene terephthalate of the second resin layer 121 may also be prepared using a direct method that uses the terephthalic acid described above, but may also be prepared by a DMT method that uses dimethyl terephthalate.

The fillers 122 may be general inorganic fillers. As an example, the fillers 122 may be silica ($SiO_2$), but are not limited thereto, and may be one or more inorganic fillers of materials such as $BaSO_4$, $CaCO_3$, and $TiO_2$, and an average particle diameter of the fillers 122 may be 2 μm to 5 μm, but is not limited thereto.

Since the rear surface layer 120 includes the fillers 122, a shape of the film 10 for manufacturing an electronic component may be maintained in the roll to roll process of manufacturing the film 10 for manufacturing an electronic component, and the film 10 for manufacturing an electronic component may be smoothly transferred in an elongation process in the roll to roll process. In addition, rigidity of the film 10 for manufacturing an electronic component may be sufficiently maintained due to the fillers 122 in the process of manufacturing the film 10 for manufacturing an electronic component.

Meanwhile, it has been illustrated in FIG. 3 that the fillers 122 are dispersed only in the rear surface layer 120, but the present disclosure is not limited thereto. As an example, the fillers 122 may be dispersed in the front surface layer 110 as well.

Meanwhile, referring to FIG. 3, in the film 10 for manufacturing an electronic component according to an exemplary embodiment, an average thickness of the rear surface layer 120 may be greater than an average thickness of the front surface layer 110.

In the present disclosure, an 'average thickness' does not refer to a thickness in any one region, but may refer to an average value of thicknesses in a plurality of regions of a corresponding component. For example, the average thickness of the front surface layer 110 may refer to an average value of values obtained by measuring the shortest distances between one surface and the other surface of the front surface layer 110 opposing each other in a stacked direction of the film 10 for manufacturing an electronic component, in five arbitrary regions spaced apart from each other in the front surface layer 110.

In addition, a thickness ratio between the front surface layer 110 and the rear surface layer 120 may be from 1:9 to 3:7. That is, when the average thickness of the film 10 for manufacturing an electronic component including the front surface layer 110 and the rear surface layer 120 is 100, the average thickness of the front surface layer 110 may be 10 to 30, and the average thickness of the rear surface layer 120 may be 90 to 70.

Since the front surface layer 110 and the rear surface layer 120 have the above-described average thickness ratio, the film 10 for manufacturing an electronic component according to an exemplary embodiment may have a sufficient magnetic property and sufficient conductivity, and may have sufficient rigidity in the process of manufacturing the film 10 for manufacturing an electronic component due to the fillers 122.

Figure 4:
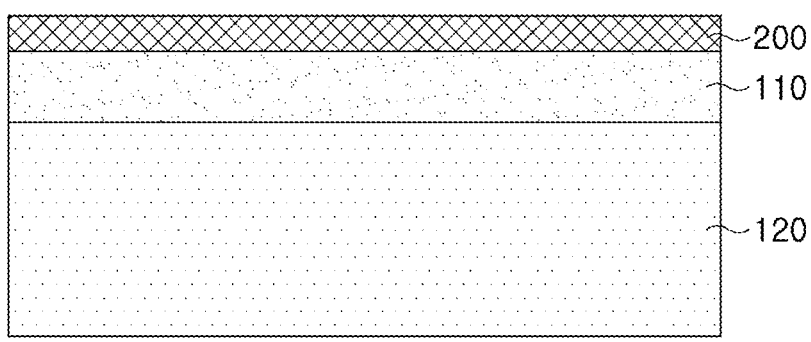
FIG. 4 is a plan view illustrating a film for manufacturing an electronic component according to a modified example in the present disclosure.

FIG. 4 is a plan view illustrating a film for manufacturing an electronic component according to a modified example in the present disclosure.

Referring to FIG. 4, a film 11 for manufacturing an electronic component according to a modified example is illustrated.

The film 11 for manufacturing an electronic component according to a modified example may include a front surface layer 110, a rear surface layer 120 disposed on one surface of the front surface layer 110, and a release layer 200 disposed on the other surface of the front surface layer 100 opposing one surface of the front surface layer 110.

Since the film 11 for manufacturing an electronic component according to a modified example further includes only the release layer 200 as compared with the film 10 for manufacturing an electronic component according to an exemplary embodiment, a description for components other than the release layer 200 overlaps that described above in the film 10 for manufacturing an electronic component according to an exemplary embodiment.

The release layer 200 may be disposed on the other surface of the front surface layer 110 to allow the film 11 for manufacturing an electronic component to be easily peeled off from an electronic component to be disposed on the film 11 for manufacturing an electronic component later or a molded layer/printed layer of the electronic component.

The release layer 200 may be a silicone release layer. For example, the release layer 200 may include a colored coating composition including a mixed component including alkenyl polysiloxane and hydrogen polysiloxane, a platinum catalyst-containing compound, an epoxy-based compound, a dye, and the remaining amount of a solvent, and may have a structure in which the colored coating composition is applied once or more. Meanwhile, a material of the release layer 200 according to the present disclosure is not limited thereto. As another example, the release layer 200 according to the present disclosure may include a silicone release composition containing dimethylpolysiloxane as a main material. Meanwhile, the release layer 200 may have an average thickness of 10 nm to 200 nm.

The release layer 200 may be applied and disposed on the other surface of the front surface layer 110 after an extrusion and cooling process of the film 10 for manufacturing an electronic component to be described later.

Since the film 11 for manufacturing an electronic component according to a modified example includes the release layer 200, the front surface layer 110 and the rear surface layer 120 and further includes metal nanowires 112 and fillers 122, sheet resistance (ohm/sq ($\Omega/\square$)) of a surface of the release layer 200 of the film 11 for manufacturing an electronic component according to a modified example may be kept low. The sheet resistance may be measured by the four-probe method, which is also known as the Kelvin technique.

As an example, the release layer 200 of the film 11 for manufacturing an electronic component according to a modified example in the present disclosure may have one surface facing the front surface layer 110 and the other surface opposing the one surface, and sheet resistance on the other surface of the release layer 200 may be $10^{10}\Omega/\square$ or less. Therefore, an amount of static electricity generated in the film 11 for manufacturing an electronic component according to a modified example may be decreased, and mixing of foreign materials, damage to the electronic component, and the like, due to the generation of the static electricity may be prevented.

A description for other components overlaps that described above in the film for manufacturing an electronic component according to an exemplary embodiment, and is thus omitted.

Figure 5:
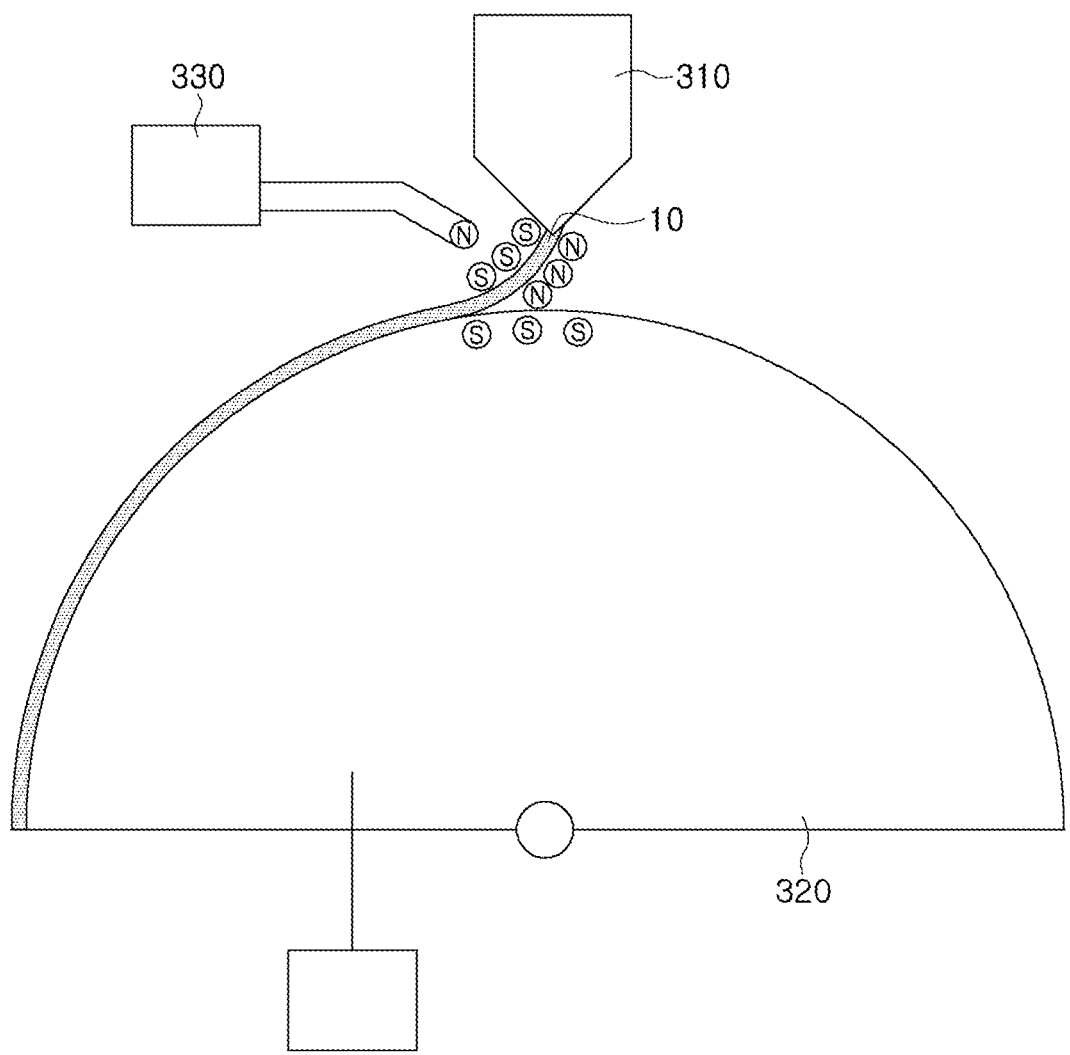
FIG. 5 is a view illustrating some processes in manufacturing the film for manufacturing an electronic component according to an exemplary embodiment in the present disclosure.

FIG. 5 is a view illustrating some processes in manufacturing the film for manufacturing an electronic component according to an exemplary embodiment in the present disclosure.

Referring to FIG. 5, a melted film 10 for manufacturing an electronic component including a front surface layer 110 and a rear surface layer 120 may be extruded from an extruder 310. In this case, in order to uniformly elongate the extruded melted film 10 for manufacturing an electronic component in a transverse direction and make a thickness of the extruded melted film for manufacturing an electronic component uniform, a degree of crystallinity in the extruded melted film 10 needs to be significantly decreased.

To this end, the extruded melted film 10 for manufacturing an electronic component of FIG. 5 may be closely adhered to a casting roll or a cooling roll 320 to be subjected to a cooling process. The extruded melted film 10 for manufacturing an electronic component may have a temperature of 260° C. to 270° C., and may be cooled by the cooling roll 320 having a temperature of 20° C. to 25° C. In this case, the front surface layer 110 of the melted film 10 for manufacturing an electronic component may be closely adhered to a surface of the cooling roll 320 so as to be in contact with the cooling roll 320, and the metal nanowires 112 may be included in the front surface layer 110 to secure a high close adhesion force.

In order to more efficiently perform the cooling process in the cooling roll 320, the melted film 10 for manufacturing an electronic component needs to be more closely adhered to the cooling roll 320. As described above, the film 10 for manufacturing an electronic component according to the present disclosure may include the metal nanowire 112 therein to have a magnetic property.

A magnetic band 330 may be used using characteristics of the film 10 for manufacturing an electronic component having the magnetic property. A magnetic force of the magnetic band 330 may be about 0.05 N to 10 N, and as an example, the magnetic band may have a magnetic property of an N pole, such that a surface of the melted film 10 for manufacturing an electronic component close to the magnetic band 330 may have an S pole and a surface of the melted film 10 for manufacturing an electronic component close to the cooling roll 320 may have an N pole. In this case, when the cooling roll 320 is controlled to have an S pole, the melted film 10 for manufacturing an electronic component may be closely adhered to the cooling roll 320 without physical damage by using a magnetic force. Meanwhile, control may also be performed so that a magnetic force is formed as opposed to the above-described example.

As a method for closely adhering the melted film 10 for manufacturing an electronic component to the cooling roll 320 in the related art, there may be a physical close adhesion method that uses an air nozzle or an electrical close adhesion method that uses addition of an antistatic agent and an electricity applying method.

However, in a case of the physical close adhesion method, an air mark may be generated on a surface of the melted film 10 due to spraying of the air nozzle, which may physically damage the surface of the melted film 10 and make a thickness of the metal film 10 non-uniform.

Also in a case of the electrical close adhesion method, compatibility in the molten polymer may be decreased due to excessive addition of the antistatic agent, which may cause a decrease in a surface roughness of the final film 10.

In the present disclosure, the melted film 10 for manufacturing an electronic component may be effectively attached to the cooling roll 320 without physical damage by using the metal nanowires 112 having the magnetic property and the magnetic band 330 and the cooling roll 320 having the magnetic properties.

Thereafter, the cooled melted film 10 for manufacturing an electronic component may be elongated 1.5 times to 3 times in a longitudinal direction and elongated 2 to 4 times in the transverse direction to be manufactured as a film having a thickness of 15 μm to 50 μm.

Figure 6:
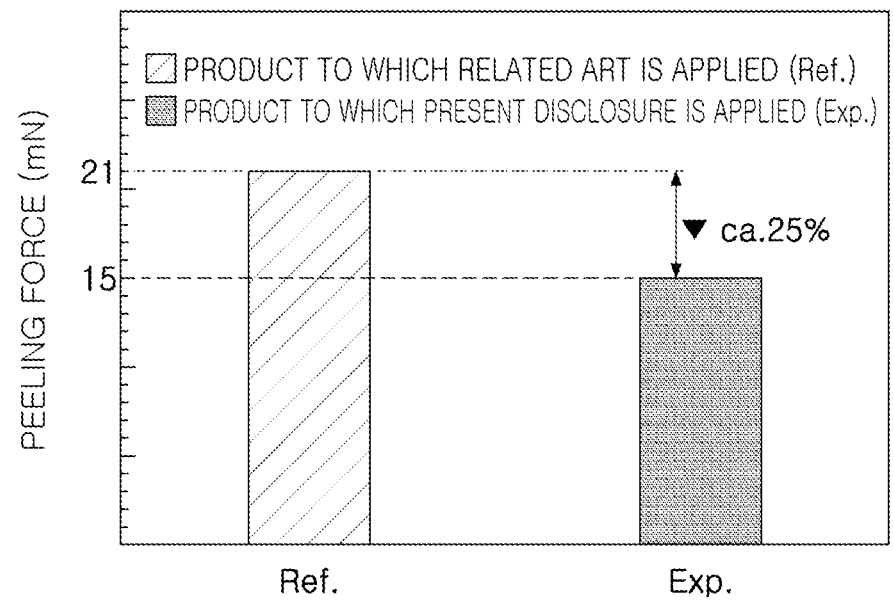
FIG. 6 is schematic comparison graphs illustrating an improvement effect of peeling force when the film for manufacturing an electronic component according to an exemplary embodiment in the present disclosure is used.

FIG. 6 is schematic comparison graphs illustrating an improvement effect of peeling force when the film for manufacturing an electronic component according to an exemplary embodiment in the present disclosure is used.

Referring to FIG. 6, graphs for comparing peeling force of the films 10 and 11 for manufacturing an electronic component according to an exemplary embodiment and a modified example in the present disclosure that include the metal nanowires 112 with peeling force of a film according to the related art that does not include the metal nanowires 112 are illustrated.

As illustrated in the graphs of FIG. 6, the films 10 and 11 for manufacturing an electronic component according to an exemplary embodiment and a modified example may have peeling force decreased by about 25% as compared with the film according to the related art. Therefore, the films 10 and 11 for manufacturing an electronic component according to an exemplary embodiment and a modified example may be easily peeled off from an electronic component to be mounted on the films 10 and 11 for manufacturing an electronic component according to an exemplary embodiment and a modified example later or a molded layer and a printed layer of the electronic component, and damage to the electronic component or the molded layer and the printed layer of the electronic component may be prevented.

Figure 7:
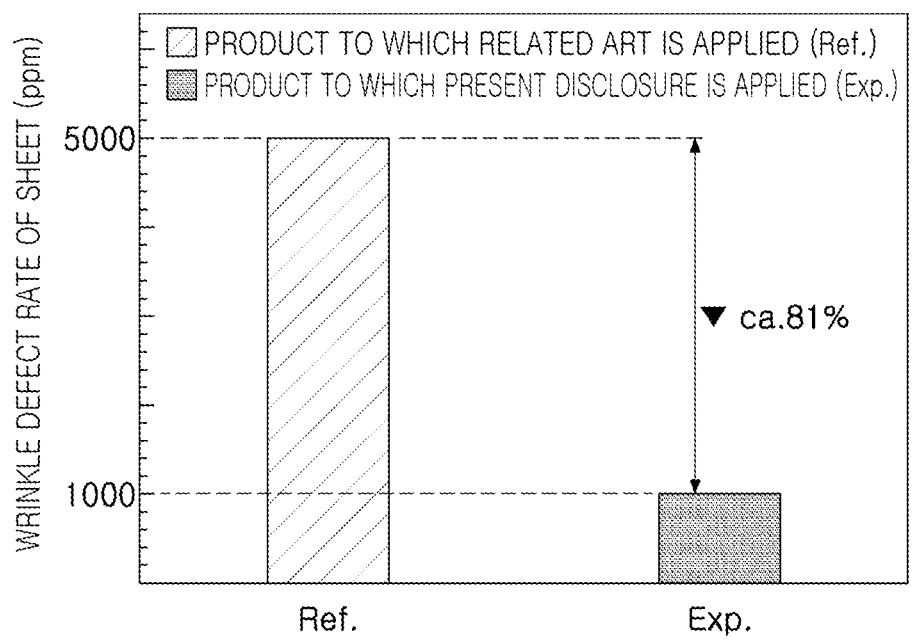
FIG. 7 is schematic comparison graphs illustrating an improvement effect of a wrinkle defect rate of a ceramic sheet when the film for manufacturing an electronic component according to an exemplary embodiment in the present disclosure is used.

FIG. 7 is schematic comparison graphs illustrating an improvement effect of a wrinkle defect rate of a molded layer and a printed layer when the film for manufacturing an electronic component according to an exemplary embodiment in the present disclosure is used.

Referring to FIG. 7, graphs for comparing a wrinkle defect rate (ppm) of the films 10 and 11 for manufacturing an electronic component according to an exemplary embodiment and a modified example in the present disclosure that include the metal nanowires 112 with a wrinkle defect rate of the film according to the related art that does not include the metal nanowires 112 are illustrated.

As illustrated in the graphs of FIG. 7, the films 10 and 11 for manufacturing an electronic component according to an exemplary embodiment and a modified example may have a wrinkle defect rate decreased by about 81% as compared with the film according to the related art, and thus have a uniform average thickness. Since the films 10 and 11 have the uniform thickness, damage to a shape of an electronic component to be disposed on the films 10 and 11 later or a molded layer and a printed layer of the electronic component may be prevented, and a phenomenon in which foreign materials are mixed due to static electricity may be prevented.

Figure 8:
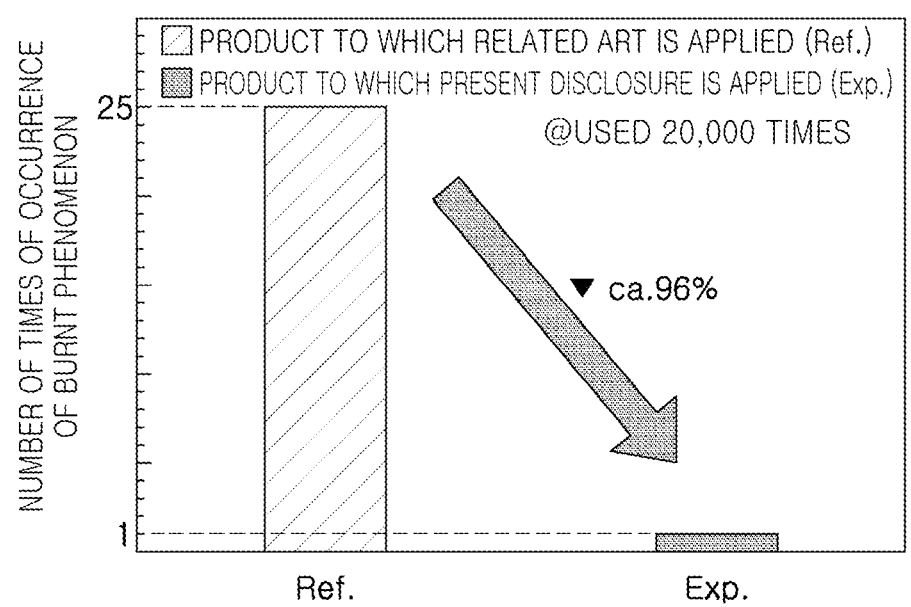
FIG. 8 is schematic comparison graphs illustrating an improvement effect of the number of times of the occurrence of a burnt phenomenon when the film for manufacturing an electronic component according to an exemplary embodiment in the present disclosure is used.

FIG. 8 is schematic comparison graphs illustrating an improvement effect of the number of times of the occurrence of a burnt phenomenon on a surface of a stacking facility member due to static electricity when the film for manufacturing an electronic component according to an exemplary embodiment in the present disclosure is used.

Referring to FIG. 8, graphs for comparing the number of times of the occurrence of a burnt phenomenon in which a product is burnt blackly by the films 10 and 11 for manufacturing an electronic component according to an exemplary embodiment and a modified example in the present disclosure that include the metal nanowires 112 with the number of times of the occurrence of a burnt phenomenon in which a product is burnt blackly by the film according to the related art that does not include the metal nanowires 112 are illustrated.

When an antistatic property is not sufficiently implemented, an excessive voltage and current may formed due to static electricity, such that an acceptable current may flow, and thus, a burnt phenomenon may occur.

As illustrated in the graphs of FIG. 8, it can be seen that the burnt phenomenon is decreased by about 96% in the films 10 and 11 for manufacturing an electronic component according to an exemplary embodiment and a modified example in the present disclosure as compared with the film according to the related art at the time of performing an experiment on 20,000 products, and accordingly, damage to a stacking member according to an exemplary embodiment and a modified example may be prevented later.

As set forth above, according to an exemplary embodiment in the present disclosure, a film for manufacturing an electronic component for preventing generation of static electricity during a manufacturing process may be provided.

In addition, a film for manufacturing an electronic component for increasing cooling efficiency during a manufacturing process may be provided.

Further, a film for manufacturing an electronic component for having a uniform thickness may be provided.

Further, a film for manufacturing an electronic component for facilitating peeling of a ceramic sheet and enabling manufacturing of the electronic component without damage, at the time of manufacturing the electronic component may be provided.

While exemplary embodiments have been shown and described above, it will be apparent to those skilled in the art that modifications and variations could be made without departing from the scope of the present invention as defined by the appended claims.

What is claimed is:

1. A film for manufacturing an electronic component, comprising:
    a polymer layer including a front surface layer, a rear surface layer disposed on the front surface layer, and a silicone release layer disposed on the front surface layer; and
    metal nanowires dispersed in the polymer layer,
    wherein a content of the metal nanowires in the front surface layer is less than 0.2 wt %.

2. The film for manufacturing an electronic component of claim 1, wherein the polymer layer includes a polyester-based compound.

3. The film for manufacturing an electronic component of claim 2, wherein the polyester-based compound includes polyethylene terephthalate (PET).

4. The film for manufacturing an electronic component of claim 3, wherein the metal nanowires include a ferromagnetic metal.

5. The film for manufacturing an electronic component of claim 4, wherein the ferromagnetic metal includes at least one of nickel (Ni), cobalt (Co), or iron (Fe), or alloys thereof.

6. The film for manufacturing an electronic component of claim 1, wherein the metal nanowires are dispersed in the front surface layer of the polymer layer.

7. The film for manufacturing an electronic component of claim 1, further comprising fillers dispersed in the polymer layer.

8. The film for manufacturing an electronic component of claim 7, wherein the fillers are dispersed in the rear surface layer.

9. The film for manufacturing an electronic component of claim 1, wherein an aspect ratio of the metal nanowires is 10 to 500.

10. The film for manufacturing an electronic component of claim 1, wherein an average thickness of the rear surface layer is greater than an average thickness of the front surface layer, and
    a thickness ratio between the front surface layer and the rear surface layer is from 1:9 to 3:7.

11. The film for manufacturing an electronic component of claim 10, wherein sheet resistance on a surface of the silicone release layer is 1010 22/à or less.

12. The film for manufacturing an electronic component of claim 5, wherein the ferromagnetic metal includes nickel (Ni) or the alloy thereof.

13. The film for manufacturing an electronic component of claim 5, wherein the ferromagnetic metal includes cobalt (Co) or the alloy thereof.

14. The film for manufacturing an electronic component of claim 5, wherein the ferromagnetic metal includes iron (Fe) or the alloy thereof.

15. A method for manufacturing an electronic component, the method comprising:
    contacting a film and the electronic component; and then peeling the film from the electronic component,
    wherein the film comprises:
        a polymer layer including a front surface layer, a rear surface layer disposed on the front surface layer, and a silicone release layer disposed on the front surface layer; and
        metal nanowires dispersed in the polymer layer, the metal nanowires including a ferromagnetic metal including at least one of nickel (Ni), cobalt (Co), or iron (Fe), or alloys thereof,
    wherein a content of the metal nanowires in the front surface layer is less than 0.2 wt %.

16. The method of claim 15, wherein the electronic component is a capacitor.

17. A film for manufacturing an electronic component, comprising:
    a polymer layer including a front surface layer, a rear surface layer disposed on the front surface layer, and a release layer disposed on the front surface layer; and
    metal nanowires dispersed in the polymer layer,
    wherein the release layer has an average thickness of 10 nm to 200 nm, and
    wherein a content of the metal nanowires in the front surface layer is less than 0.2 wt %.

* * * * *